US012339975B2

(12) United States Patent
Syassen et al.

(10) Patent No.: US 12,339,975 B2
(45) Date of Patent: Jun. 24, 2025

(54) SECURITY DEVICE AND METHODS OF OPERATING A SECURITY DEVICE

(71) Applicant: Infineon Technologies AG, Neubiberg (DE)

(72) Inventors: Joerg Syassen, Oberhausen (DE); Avni Bildhaiya, Deisenhofen bei Muenchen (DE); Andreas Graefe, Munich (DE); Albrecht Mayer, Deisenhofen (DE); Manuela Meier, Munich (DE); Viola Rieger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 353 days.

(21) Appl. No.: 17/700,643

(22) Filed: Mar. 22, 2022

(65) Prior Publication Data

US 2022/0309169 A1 Sep. 29, 2022

(30) Foreign Application Priority Data

Mar. 24, 2021 (DE) ...................... 10 2021 107 364.2

(51) Int. Cl.
*G06F 21/60* (2013.01)
*G06F 21/70* (2013.01)

(52) U.S. Cl.
CPC ............ *G06F 21/602* (2013.01); *G06F 21/70* (2013.01)

(58) Field of Classification Search
CPC ......... G06F 21/602; G06F 21/70; G06F 21/72
See application file for complete search history.

(56) References Cited

U.S. PATENT DOCUMENTS

| 5,165,497 | A | * | 11/1992 | Chi | ..................... | B60K 31/0008 |
| | | | | | | 340/904 |
| 10,721,258 | B2 | * | 7/2020 | Sood | ....................... | H04L 63/20 |
| 11,644,834 | B2 | * | 5/2023 | Ditty | ................... | G06F 15/7807 |
| | | | | | | 701/23 |
| 11,972,033 | B2 | * | 4/2024 | Johnson | ................ | G06F 21/602 |
| 2010/0332851 | A1 | | 12/2010 | Priel et al. | | |
| 2015/0185268 | A1 | | 7/2015 | Falk | | |
| 2017/0344438 | A1 | | 11/2017 | Bilgiday et al. | | |
| 2020/0218808 | A1 | | 7/2020 | Hershman | | |
| 2021/0409210 | A1 | * | 12/2021 | Krummel | ................ | G06F 21/33 |

FOREIGN PATENT DOCUMENTS

| DE | 102006005053 A1 | 8/2007 |
| DE | 102013214398 A1 | 1/2015 |

* cited by examiner

*Primary Examiner* — Sm A Rahman
(74) *Attorney, Agent, or Firm* — Eschweiler & Potashnik, LLC

(57) ABSTRACT

A device includes a safety domain having a processing unit and a memory and is configured to provide at least one functionality and to implement one more safety measures for detecting faults. The safety domain is configured to transmit at least one alarm signal indicating one or more detected errors in response to detecting the faults. The device further includes a security domain having a processing unit and a memory and is configured to provide cryptographic services and to obtain alarm signals. The security domain is configured to perform security-related operations in a secure state in response to obtaining an alarm signal from the safety domain.

25 Claims, 3 Drawing Sheets

300

- 310: providing, by the safety domain, one or more nominal functionalities
- 320: providing by the security domain, one or more cryptographic services
- 330: detecting, by a safety domain, one or more faults
- 340: transmitting, by the safety domain, at least one alarm signal indicating at least one error in response to detecting the faults
- 350: obtaining, by a security domain, the at least one alarm signal indicating the at least one error
- 360: performing, by the security domain, at least one security-related operation in at least one secure state in response to obtaining the at least one alarm signal from the safety domain

FIG. 3

SECURITY DEVICE AND METHODS OF OPERATING A SECURITY DEVICE

REFERENCE TO RELATED APPLICATION

This application claims the benefit of German Application number 10 2021 107 364.2, filed on Mar. 24, 2021, the contents of which are hereby incorporated by reference in their entirety.

TECHNICAL FIELD

Various embodiments generally relate to device security.

BACKGROUND

Microcontrollers may contain a security domain (sometimes called e.g. Security Hardware Extension (SHE) or High Security Module (HSM)), which as compared to chipcard controllers, generally offer very few protections against fault attacks. Fault attacks could occur due to the manipulation of an external clock, manipulation of the supply, including injection of voltage spikes, violation of the operating temperature, etc.

Microcontrollers may include sensors for monitoring supply voltage, temperature and clock but these can react too slowly to prevent the security domain from performing incorrect or wrong actions such as, for example, opening a debug interface, booting without installed protections, accepting a wrong signature, and so on. Better security measures (better, faster sensors or redundant implementation of the logic in the security domain) can be too expensive or impractical to be used in microcontrollers.

BRIEF DESCRIPTION OF THE DRAWINGS

In the drawings, like reference characters generally refer to the same parts throughout the different views. The drawings are not necessarily to scale; emphasis instead generally being placed upon illustrating the principles of the invention. In the following description, various embodiments of the invention are described with reference to the following drawings, in which:

FIG. 3 is a flow diagram of an exemplary method according to at least one exemplary embodiment of the present disclosure.

DESCRIPTION

Figure 1:
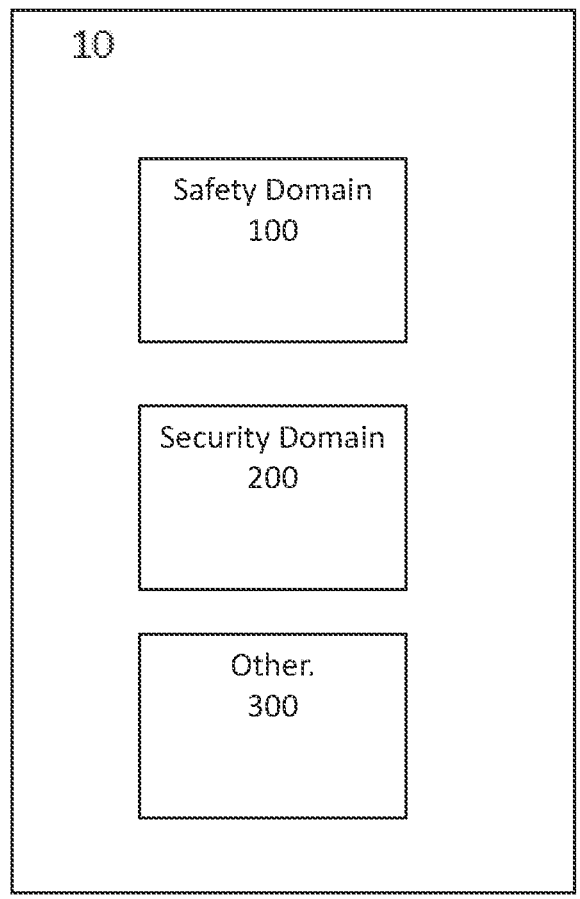
FIGS. 1-2 each illustrate a diagram of an exemplary device according to at least one exemplary embodiment of the present disclosure.

The following detailed description refers to the accompanying drawings that show, by way of illustration, specific details and embodiments in which the invention may be practiced.

The word "exemplary" is used herein to mean "serving as an example, instance, or illustration." Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e., one or more. Any term expressed in the plural form that does not expressly state "plurality" or "multiple" likewise refers to a quantity equal to or greater than one. The terms "proper subset", "reduced subset", and "lesser subset" refer to a subset of a set that is not equal to the set, i.e., a subset of a set that contains fewer elements than the set.

The terms "at least one" and "one or more" may be understood to include a numerical quantity greater than or equal to one (e.g., one, two, three, four, [ . . . ], etc.).

As used herein, unless otherwise specified, the use of the ordinal adjectives "first", "second", "third", etc., to describe a common object merely indicate that different instances of like objects are being referred to, and are not intended to imply that the objects so described must be in a given sequence, either temporally, spatially, in ranking, or in any other manner.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. However, the term data is not limited to the aforementioned examples and may take various forms and represent any information as understood in the art.

The term "processor" or "controller" as, for example, used herein may be understood as any kind of entity that allows handling data, signals, etc. The data, signals, etc., may be handled according to one or more specific functions executed by the processor or controller.

A processor or a controller may thus be or include an analog circuit, digital circuit, mixed-signal circuit, logic circuit, processor, microprocessor, Central Processing Unit (CPU), Neuromorphic Computer Unit (NCU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, signal processor, Central Processing Unit ("CPU"), Graphics Processing Unit ("GPU"), Neuromorphic Computer Unit (NCU), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions, which will be described below in further detail, may also be understood as a "circuit." It is understood that any two (or more) of the circuits detailed herein may be realized as a single circuit with substantially equivalent functionality. Conversely, any single circuit detailed herein may be realized as two (or more) separate circuits with substantially equivalent functionality. Additionally, references to a "circuit" may refer to two or more circuits that collectively form a single circuit.

As utilized herein, terms "module", "component," "system," "circuit," "element," "interface," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As used herein, a "signal" may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in a computer-readable storage medium prior to its receipt by the receiving component. The receiving component may retrieve the signal from the storage medium. Further, a "value" that is "indicative of" some quantity, state, or parameter may be physically embodied as a digital signal, an analog signal, or stored bits that encode or otherwise communicate the value.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electromagnetic wave in the other element without physical contact or intervening components. Further, when a voltage, current, or signal is referred to as being "applied" to an element, the voltage, current, or signal may be conducted to the element by way of a physical connection or by way of capacitive, electromagnetic, or inductive coupling that does not involve a physical connection.

As used herein, "memory" is understood as a non-transitory computer-readable medium where data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory and thus may refer to a collective component comprising one or more types of memory. Any single memory component may be separated into multiple collectively equivalent memory components and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

Exemplary embodiments of the present disclosure may be realized by one or more computers (or computing devices) reading out and executing computer-executable instructions recorded on a storage medium (e.g., non-transitory computer-readable storage medium) to perform the functions of one or more of the herein-described embodiment(s) of the disclosure. The computer(s) may comprise or include one or more of a central processing unit (CPU), a microprocessing unit (MPU), or other circuitry, and may include a network of separate computers or separate computer processors. The computer-executable instructions may be provided to the computer, for example, from a network or a non-volatile computer-readable storage medium. The storage medium may include, for example, one or more of a hard disk, a random-access memory (RAM), a read-only memory (ROM), a storage of distributed computing systems, an optical drive (such as a compact disc (CD), digital versatile disc (DVD), or Blu-ray Disc (BD), a flash memory device, a memory card, and the like. By way of illustration, specific details and embodiments in which the invention may be practiced.

FIG. 1 shows a diagram illustrating an integrated processing device 10. Some examples of the integrated processing device 10 or simply device 10, may be or include a microcontroller/microcontroller unit, microprocessor, and the like. The device 10 can include a plurality of collocated or substantially collocated components. In the example of FIG. 1, the device 10 includes a safety domain 100, a security domain 200, and one or other components or features 300 which can be collocated or substantially collocated.

According to exemplary embodiments of the present disclosure, the safety domain 100 may include safety measures for detecting faults, including, for example, random hardware originating from improper or wrong operating conditions. For example, the safety domain 100 may use sensors which may be connected to the security domain 200 so to prevent the safety domain 100 from making incorrect or wrong decisions due to these wrong or manipulated operating conditions.

The safety domain 100 described herein can execute one or more processes so as to provide or perform one or more functionalities of the device 10. The processes or functionalities can be protected by one or more safety measures that ensure that hardware faults are detected with a high level probability, for example, according to the demands of an established safety standard. The executed processes or functionalities (e.g., the purpose of the device 10) may include control functions such as, for example, controlling a vehicle, controlling a motor, e.g., of a vehicle, controlling brakes of a vehicle, etc. In other cases, the processes or functionalities may include extracting data from radar measurements or any other applications.

The safety domain 100 can contain at least one processing unit (e.g., processor/CPU) and one or more memories (e.g., RAM) for storage of data. Further, the safety domain 100 can have application specific peripherals, such as, for communication (e.g., Ethernet, Controller Area Network (CAN), FlexRay, Serial Peripheral Interface (SPI), etc.), for receiving sensor data (Single Edge Nibble Transmission (SENT), Peripheral Sensor Interface 5 (PSI5)), for attaching external memories (e.g., External Bus Unit (EBU), Secure Digital/MultiMediaCard (SDMMC), NOR Flash), for measuring events and driving Pulse Width Modulation (PWM) data (timer unit), and/or for measuring or driving analog values (Analog-to-Digital (ADC), Digital-to-Analog (DAC)). In one example, the safety domain 100 may be implemented as a system that includes memory and at least one processor configured to performed the described processes or functionalities.

The safety domain 100 can contain its own non-volatile storage for code and data. A processor of the safety domain 100 can execute the code to execute processes and perform various functions described herein.

For safety purposes, the safety domain 100 can include a unit or circuitry that collects detected alarms (e.g., alarm signals) and is configured to execute or initiate predefined actions (reset integrated processing device/microcontroller, interrupt CPU, signal to outside safety alarm) to such alarms.

As shown in FIG. 1, the device further includes the security domain 200 which can provide cryptographic services and/or security supervision functionality or process. One purpose of the security domain 200 can be to protect cryptographic keys from access or unauthorized access, such as from the safety domain 100. This functionality or protection service can be realized as fixed function unit that implements a certain standard, like Secure Hardware Extension (SHE) from Hersteller Initiative Software (HIS).

The security domain 200 can also contain its own CPU, memory (e.g., RAM) and include peripherals such as, cryptographic accelerators, random number generators, etc. Further, the security domain 200 can include a cryptographic key storage and storage for code and data. For example, the security domain 200 may be at least partly distinguished from the safety domain 100 in the fact that it may provide cryptographic services and include cryptographic keys while the safety domain does not provide or include such services or store cryptographic keys. In one example, the security domain 200 may be implemented as a system that includes memory and at least one processor configured to performed the described processes or functionalities.

Like the safety domain 100, the security domain 200 can contains a unit to collect detected alarms (e.g., alarm signals) and execute predefined actions (reset security domain, interrupt security CPU, block keys) in response to the alarms.

The safety domain 100 and the security domain 200 can be connected with a communication interface, which for example, can be a bus of the device 10, e.g., a part of the bus system.

According to exemplary embodiments of the present disclosure, the safety domain 100 may detect a fault and sends an alarm signal to the security domain 200. The security domain 200 may take actions as if the security domain itself had detected a fault (hardware or software).

Figure 2:
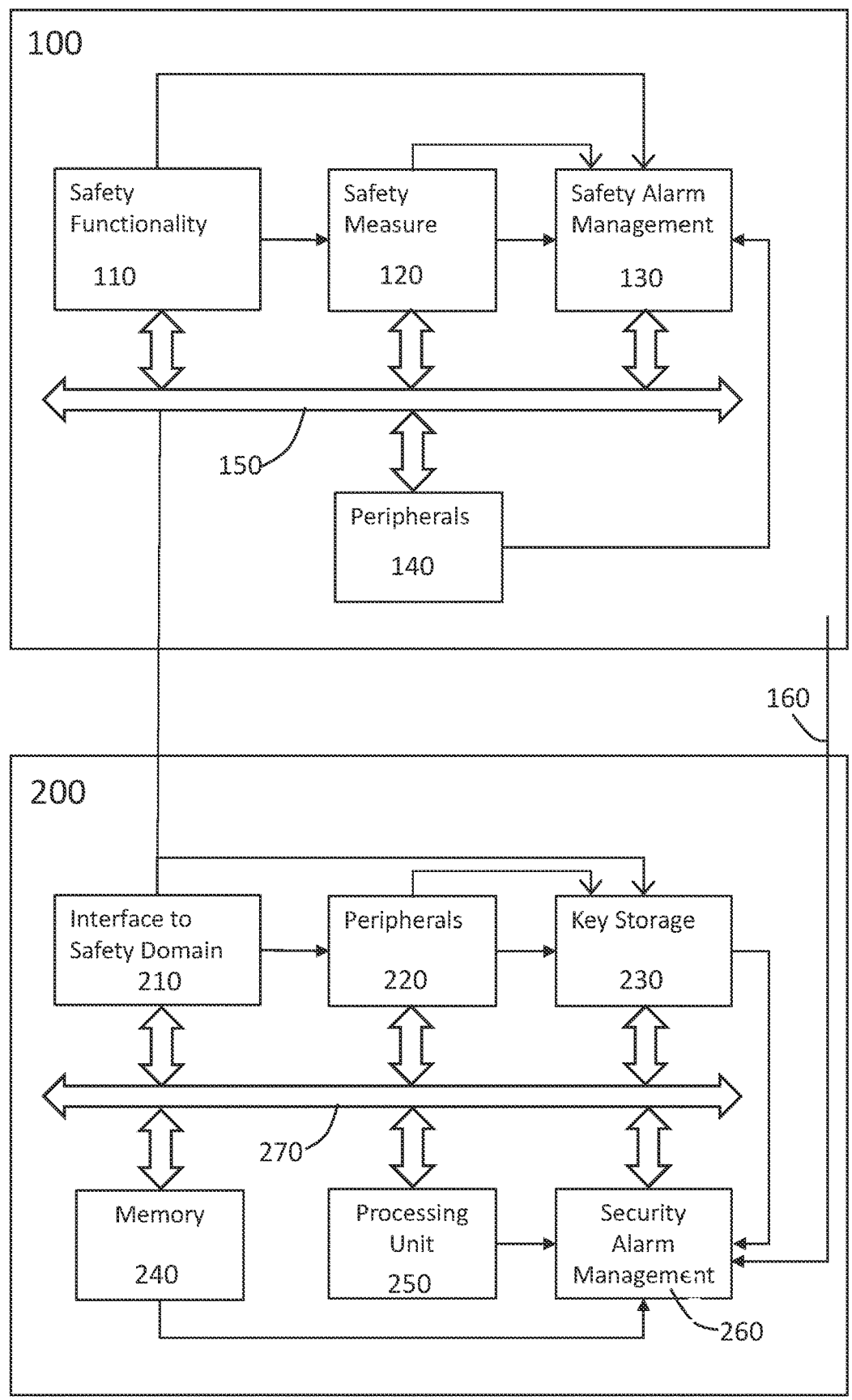

FIG. 2 is a diagram illustrating aspects of the device 10 in more detail according to exemplary embodiments of the present disclosure. FIG. 2 shows the device 10 including a safety domain 100 a security domain 200, and other components 300.

In FIG. 2, the safety domain 100 includes components or circuits such as a safety functionality circuitry 110, a safety measure circuitry 120, a safety alarm management circuitry 130, and other peripheral(s) 140. The safety domain 100 may include a communication interface 150 which may be one or more buses that allow for coupling the components to one another. The connections shown in FIG. 2 are exemplary, and other or alternative connections of the components as well as interfaces may be realized.

The safety functionality circuitry 110 may be any suitable or appropriate combination of hardware and software components configured to performs or implement one or more actions, functions, or operations. In some instances, the safety functionality circuitry 110 may perform one or more actions for controlling components of a vehicle, including, for example controlling a motor, brakes etc. of a vehicle. In other examples, the safety functionality circuitry 110 may be configured to process obtained sensor data, including, for example, extracting and/or processing data from radar measurements. The safety functionality circuitry 110 may be implemented by a processing circuitry, e.g., processor(s)/digital circuits, and memory for storage of data or code.

The safety domain 100 of FIG. 2 further includes the safety measure circuitry 120, which can be a component responsible for monitoring and detecting faults, e.g., hardware and/or software faults of the safety domain 100. The faults detected by the safety measures circuitry 120 may originate from improper or incorrect operating conditions. The safety measures circuitry 120 may be realized as any suitable combination of hardware and software that are configured to detect or determine faults of the device 10. The faults may be detected by observing data related to operating conditions, e.g., temperature, voltage, clock signals, and the like. Other actions for determining or ascertaining may include the safety domain 100 operating in a lockstep mode. For example, one or more processors of the safety domain 100 operate in lockstep for a duration of time or until the fault is corrected or removed. In such cases, the components operating in lockstep can operate or execute in parallel and substantially concurrent with one another, or from one well-defined state to the next well-defined state. For example, during, lockstep, a cycle-by-cycle comparison of the outputs of the lockstep CPU against the outputs of another "productive" CPU.

The safety measure circuitry 120 may also cause or implement redundant encoding of data in the safety domain 100. That is, the safety domain 100 or components thereof of may redundantly encode data that is to be transmitted by the safety domain 100, e.g., to another component or device. For example, the safety measure component may implement error-code correction (ECC) protections, e.g., for communication interfaces of the device 10, e.g., a main bus of the device 10. This may be used for determining or discovering hardware/software faults such as the detection of transmission errors, e.g., on chip and off chip.

In response to detecting a fault, one or more signals (alarm signals) may be sent by the safety measure circuitry 120 to other components or devices. For example, the safety measure circuitry 120 can send one or more signals internally to the safety alarm management circuitry 130.

The safety alarm management circuitry 130 can be a component responsible for initiating or implementing (predefined) actions in response to being informed that there is a fault or error. For example, in response to obtaining or receiving an alarm signal from the safety measure circuitry 120, one or more remedial or safety actions can be performed. The actions may be predefined actions that can be automatically executed in response to the alarm signals. Such actions may include the safety domain 100 operating in a lockstep mode. For example, one or more processors of the safety domain 100 operate in lockstep for a duration of time or until the fault is corrected or removed. In such cases, the components operating in lockstep can operate or execute in parallel and substantially concurrent with one another, or from one well-defined state to the next well-defined state.

The safety alarm management circuitry 130 can implement actions such as resetting the device 10, or other components thereof, implementing an interrupt service routine, e.g., for one or more processors of the safety domain circuitry 100, and sending or transmitting safety alarm signals to other devices/components.

The safety alarm management circuitry 130 may receive and collect alarm signals from other components (e.g., peripherals 140) that indicate faults or errors.

The safety domain 100 may include one or more peripherals 140 such as application specific components, sensor devices, etc. Sensor devices may be used for obtaining sensor data may be for application specific purposes or in other cases may obtain data regarding operating condition of the device 10 or safety domain 100.

The security domain 200 of FIG. 2 can include an interface to the safety domain 210, peripherals 220, a key storage 230, memory (e.g., RAM) 240, a processing unit (e.g., a CPU) 250, a security alarm management circuitry 260 and a communication interface 270. The interface 210 may be any suitable interface for facilitating communication between the safety domain 100 and the security domain 200.

The security domain 200 may also include peripherals 220 which may be any suitable components, including components for implementing security or cryptographic services or other application-specific functions. The security domain 200 can store cryptographic keys in a key storage 230.

Additionally, the security domain 200 may include a memory 240 and a processing unit 250 that can be used for performing certain actions or operations. The processing unit may be one or more processors (e.g., CPU) or processor cores. For example, in one case, the device 10 may include a processor having a plurality of processor cores. A subset of the processor cores can be assigned exclusively to the security domain 200 while another different subset of the processor cores may be assigned or used by other components, e.g., the safety domain 100.

The security domain 200 can include a security alarm management circuitry 260 which can a component that initiates or implements security-related actions in response to the detection of device faults (hardware, software, etc.) and/or operating condition violations. In other words, the security alarm management circuitry 260 can cause or configure the security domain 200 to operate in a secure state and/or to perform one or more security-related actions. For example, the security alarm management circuitry 260 implement actions, e.g., security-related actions or operations, unique or tailored to the security domain 200. In some cases, the security alarm management circuitry 260 can implement actions similar to the safety alarm management 130. The implemented actions may be predefined or predetermined.

The security alarm management circuitry 260 may implement an interrupt signal that causes an interrupt routine to be performed, e.g., by the processing unit 250 or some other entities of the security domain 200. The interrupt routine may be any suitable routine that can be performed to implement security related protections.

Further, the security alarm management circuitry 260 may implement or initiate other actions specific to the security domain, including, for example, protecting the access to cryptographic keys and services. The security alarm management circuitry 260 may prevent access and usage of the cryptographic keys stored in the key storage 230 e.g., by freezing or blocking access to keys stored in key storage component 230. In other cases, the security alarm management circuitry 260 may delete or cause the deletion of cryptographic keys to prevent unauthorized access or usage.

The security alarm management circuitry 260 may initiate an action that restricts or blocks communication to and from the security domain 200 by locking communication interfaces, e.g., external interfaces coupled to the security domain 260.

Further, the security alarm management circuitry 260 can alter the actions of the actions to be performed, e.g., by the security domain 200. In one example, the security alarm management may cause one or more scheduled actions by the security domain 200 to not be performed or delay performance such scheduled actions.

In accordance with exemplary embodiments of the present disclosure, the safety domain 100 can be independent of the security domain 200 but may at least share a common environment, e.g., in a device. That is, the components or operation of the safety domain 100 can be physically and/or functionally independent or without any overlap with the security domain 200.

In one case, the safety domain 100 and the security domain 200 may be in physically separate locations. For example, the safety domain 100 and the security domain 200 may be realized as different or separate semiconductor chips. In other cases, the safety domain 100 and the security domain 200 may be realized and located on a same semiconductor substrate but in different physical hardware components, with no overlapping or using the same resources.

In other cases, the safety domain 100 and security domain 200 may share at least one component, but in the sense of using mutually exclusive or different aspects of such a component. That is, a processor including multiple cores may be used as part of the safety domain 100 and the security domain 200. However, the safety domain 100 may be independent from the security domain 200 with the safety domain 100 using or including a different or separate subset of the cores of the processor from the security domain 200. In such cases, the subcomponents of hardware component are not shared between the safety domain 100 and the security domain 200.

Further, the safety domain 100 may be implemented using clock signals with a high clock frequency. Further, the safety measure circuitry 120 of the safety domain 100 may be continuously or substantially continuously active and configured to meet the fault detection coverage, which can be mandated by the ISO26262 standard.

By contrast, the security domain 200 operates or uses clock signals having a lower clock frequency than clock signals used by the safety domain 100, and generally has less activity than the safety domain. As a result, there is less monitoring. Accordingly, the safety measure circuitry 120 of the safety domain 100 is more active than the monitoring performed by the security domain 200. Therefore, safety measures of the safety domain 100 are more likely to produce an alarm or alarm signal before (in time and to the extent of the fault or operating condition violation) the security domain 200 will behave incorrectly.

Therefore, in embodiments of the present disclosure, alarm signals 160 generated by the safety domain 100 (in response to detecting a fault or operating condition violations) can be forwarded so as to be obtained by the security domain 200.

As shown in the example of FIG. 2, the alarm signal(s) 160 may be sent by the safety domain 100 through any suitable means or interface(s) to the security domain 100, and more specifically, to the security alarm management circuitry 260. In response to obtaining the alarm signal(s), the security alarm management circuitry 260 can then initiate or cause the security domain 200 to operate in a secure state and implement one or more security-related operations as described herein.

FIG. 3 is an exemplary method 300 according to at least one embodiment of the present disclosure. The method includes providing, by the safety domain, one or more functionalities at 310 and providing by the security domain, one or more cryptographic services at 320. The method further includes at 330 detecting, by a safety domain, one or more faults (hardware and/or software) or detecting safety-related operating condition violations. At 340, the method includes transmitting, by the safety domain, at least one alarm signal indicating at least one error in response to detecting the one or more faults (or safety-related operating condition violations). At 350, the method includes obtaining, by a security domain, the at least one alarm signal indicating the at least one error. The method includes, at 360, performing, by the security domain, at least one security-related operation in at least one secure state in response to obtaining the at least one alarm signal from the safety domain.

The following examples pertain to further aspects of this disclosure:

Example 1 is an integrated processing device including a safety domain comprising at least one processing unit and a memory and configured to execute one or more processes, control one or more peripherals, and provide one more safety measures to detect one or more hardware faults; wherein the safety domain is configured to transmit at least one alarm signal indicating detection of hardware faults; and a security domain including at least one processing unit and a memory and configured to provide one or more cryptographic services and to obtain one or more alarm signals, wherein the security domain is further configured to perform one or more security-related operations in at least one secure state in response to obtaining the one or more alarm signals, wherein the one or more alarm signals includes at least one alarm signal from the safety domain.

Example 2 is the subject matter of Example 1, wherein the security domain can operate independently of the safety domain.

Example 3 is the subject matter of Example 1 or 2, wherein the security domain can be physically separate from the safety domain.

Example 4 is the subject matter of any of Examples 1 to 3, wherein the security domain can be configured to perform one or more security-related operations including the security domain to delete cryptographic keys stored in the security domain.

Example 5 is the subject matter of any of Examples 1 to 4, wherein the security domain can be configured to perform one or more security-related operations including the security domain to send out a security interrupt signal.

Example 6 is the subject matter of any of Examples 1 to 4, wherein the security domain can be configured to perform one or more security-related operations including the security domain to reset one or more settings of the security domain.

Example 7 is the subject matter of any of Examples 1 to 4, wherein the security domain can be configured to perform one or more security-related operations including the security domain to lock one or more external interfaces of the security domain.

Example 8 is the subject matter of any of Examples 1 to 7, wherein the security domain can be configured to perform one or more security-related operations including the security domain to not perform or to delay performing one or more previously scheduled actions for at least a predefined period of time.

Example 9 is the subject matter of any of Examples 1 to 8, wherein at least one first input/output interface can be coupled exclusively to the safety domain; and at least one second input/output interface can be coupled exclusively to the security domain.

Example 10 is the subject matter of any of Examples 1 to 9, further including a first chip including the safety domain; and a second chip including the security domain, the second chip being separate from the first chip.

Example 11 is the subject matter of any of Examples 1 to 9, wherein the safety domain and the security domain can be located on a same semiconductor substrate.

Example 12 is the subject matter of any of Examples 1 to 9, wherein the integrated processing device can be a semiconductor integrated circuit chip including a plurality of processor cores, wherein the safety domain can include one or more first cores of the plurality of processor cores, and wherein the security domain can include one or more second cores of the plurality of processor cores, the first cores being separate from the second cores.

Example 13 is the subject matter of any of Examples to 12, which can further include a communication interface, wherein the communication interface is coupled to the safety domain and to the security domain.

Example 14 is the subject matter of Example 13, wherein the communication interface can include at least one bus.

Example 15 is the subject matter of any of Examples 1 to 14, wherein the safety domain can include one or more application specific peripherals.

Example 16 is the subject matter of any of Examples 1 to 15, wherein the security domain can include at least one cryptographic accelerator or random number generator.

Example 17 is the subject matter of any of Examples 1 to 16, wherein the safety domain can be configured to detect one or more hardware faults can include the safety domain to obtain sensor data and detect operating condition violations in the safety domain from the obtained sensor data.

Example 18 is the subject matter of Example 17, wherein the sensor data can include sensor data can include temperature data, supply voltage data, and/or clock data.

Example 19 is the subject matter of any of Examples 1 to 18, wherein the security domain can be configured to provide one more safety measures to detect hardware faults and/or detect one or more safety-related operating condition violations.

Example 20 is the subject matter of any of Examples 1 to 19, wherein the safety domain to provide one or more safety measures can include the safety domain to operate in a lock-step mode to detect or determine one or more hardware faults and/or safety-related operating condition violations.

Example 21 is the subject matter of any of Examples 1 to 20, wherein the safety domain to provide one or more safety measures can include the safety domain to redundantly encode data in the safety domain operate to detect or determine of hardware faults and/or one or more safety-related operating condition violations.

Example 22 is the subject matter of any of Examples 1 to 21, wherein the safety domain configured to execute one or more processes can include the safety domain configured to control a motor.

Example 23 is the subject matter of any of Examples 1 to 22, wherein the safety domain configured to execute one or more processes can include the safety domain configured to control one or more brakes of a vehicle.

Example 24 is the subject matter of any of Examples 1 to 23, wherein the safety domain configured to execute one or more processes can include the safety domain configured to extract data from one or more radar measurements obtained by the integrated processing device.

Example 25 is the subject matter of any of Examples 1 to 18, wherein the integrated processing device can be a microcontroller.

Example 26 is security domain system configured to provide one or more cryptographic services, including a memory and at least one processing unit configured to receive an alarm signal from a safety domain system that detects hardware faults, and perform one or more security-related operations in at least one secure state in response to receiving the alarm signal.

Example 27 is the subject matter of Example claim 26, wherein the one or more security-related operations include deleting cryptographic keys stored in the security domain system.

Example 28 is the subject matter of Example claim 26, wherein the one or more security-related operations include sending out a security interrupt signal.

Example 29 is the subject matter of Example claim 26, wherein the one or more security-related operations include resetting one or more settings of the security domain system.

Example 30 is the subject matter of Example claim 26, wherein the one or more security-related operations include locking one or more external interfaces of the security domain system.

Example 1A is a method, which can be performed by an integrated processing device, the method including:
  Executing, by the safety domain, one or more processes;
  Providing by the security domain, one or more cryptographic services;
  Detecting, by a safety domain, one or more hardware faults;
  Transmitting, by the safety domain, at least one alarm signal indicating at least one error in response to detection of the one or more hardware faults;
  Obtaining, by a security domain, the at least one alarm signal indicating the at least one error; and
  Performing, by the security domain, at least one security-related operation in at least one secure state in response to obtaining the at least one alarm signal from the safety domain.

Example 2A is the subject matter of Example 1A, wherein the safety domain and the security domain can operate independently of each other in the same integrated processing device.

Example 3A is the subject matter of Example 1A or 2A, wherein the safety domain and the security domain can be physically separated from each other.

Example 4A is the subject matter of any of Examples 1A to 3A, wherein performing the at least one security-related operation can include deleting or locking cryptographic keys stored in the security domain.

Example 5A is the subject matter of any of Examples 1A to 4A, wherein performing the at least one security-related operation can include transmitting from the security domain a security interrupt signal and performing a security interrupt routine.

Example 6A is the subject matter of any of Examples 1A to 5A, wherein performing the at least one security-related operation can include resetting one or more settings of the security domain.

Example 7A is the subject matter of any of Examples 1A to 6A, wherein performing the at least one security-related operation can include locking one or more external interfaces of the security domain.

Example 8A is the subject matter of any of Examples 1A to 7A, wherein performing the at least one security-related operation can include not performing in the security domain one or more previously scheduled actions for at least a predefined period of time.

Example 9A is the subject matter of any of Examples 1A to 8A, wherein the integrated processing device can be a microcontroller.

Example 10A is the subject matter of any of Examples 1A to 9A, wherein detecting one or more hardware faults can include operating, by the safety domain, in a lock step mode.

Example 11A is the subject matter of any of Examples 1A to 10A, wherein detecting one or more hardware faults can include encoding data redundantly in the safety domain.

Example 12A is the subject matter of any of Examples 1A to 11A, wherein executing the one or more processes can include controlling, by the safety domain, at least one motor.

Example 13A is the subject matter of any of Examples 1A to 12A, wherein executing the one or more processes can include controlling, by the safety domain, one or more brakes of a vehicle.

Example 14A is the subject matter of any of claims 1A to 13A, wherein executing the one or more processes can include extracting data from one or more radar measurements obtained by the integrated processing device.

Example 1B is a non-transitory computer readable medium including instructions that when executed by one or more processors cause the one or more processors to:
  Execute, by the safety domain, one or more processes;
  Provide, by the security domain, one or more cryptographic services;
  Detect, by a safety domain, one or more hardware faults;
  Transmit, by the safety domain, at least one alarm signal indicating at least one error in response to detection of the one or more hardware faults;
  Obtain, by a security domain, the at least one alarm signal indicating the at least one error;
  Perform, by the security domain, at least one security-related operation in at least one secure state in response to obtaining the at least one alarm signal from the safety domain.

Example 2B is the subject matter of Example 1B, wherein to perform the at least one security-related operation can include to delete or lock cryptographic keys stored in the security domain.

Example 3B is the subject matter of any of Examples 1B to 2B, wherein to perform the at least one security-related operation can include to transmit from the security domain a security interrupt signal and to perform a security interrupt routine.

Example 4B is the subject matter of any of Examples 1B to 3B, wherein to perform the at least one security-related operation can include to reset one or more settings of the security domain.

Example 5B is the subject matter of any of Examples 1B to 4B, wherein to perform the at least one security-related operation can include to lock one or more external interfaces of the security domain.

Example 6B is the subject matter of any of Examples 1B to 5B, wherein to perform the at least one security-related operation can include to not perform or to delay performing in the security domain one or more previously scheduled actions for at least a predefined period of time.

Example 7B is the subject matter of any of Examples 1B to 6B, wherein the one or more processors to detect the one or more hardware faults can include to operate, in the safety domain, in a lock step mode.

Example 8B is the subject matter of any of Examples 1B to 7B, wherein the one or more processors to detect the one or more hardware faults can include to encode data redundantly in the safety domain.

Example 9B is the subject matter of any of Examples 1B to 8B, wherein to execute the one or more processes can include to control, in the safety domain, at least one motor.

Example 10B is the subject matter of any of Examples 1B to 9B, wherein to execute the one or more processes can include to control, in the safety domain, one or more brakes of a vehicle.

Example 11B is the subject matter of any of claims 1B to 10B wherein to execute the one or more processes can include to extract data from one or more obtained radar measurements.

It should be noted that one or more of the features of any of the examples above may be suitably or appropriately combined with any one of the other examples.

The foregoing description has been given by way of example only and it will be appreciated by those skilled in the art that modifications may be made without departing from the broader spirit or scope of the invention as set forth in the claims. The specification and drawings are therefore to be regarded in an illustrative sense rather than a restrictive sense.

The scope of the disclosure is thus indicated by the appended claims and all changes which come within the meaning and range of equivalency of the claims are therefore intended to be embraced.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. An integrated processing device comprising:
   a security domain comprising at least one processing unit and a memory and configured to provide one or more cryptographic services;
   a safety domain coupled to the security domain, the safety domain comprising at least one processing unit and a memory and configured to execute one or more processes, control one or more peripherals, and provide one more safety measures to detect one or more hardware faults, wherein the safety domain operates continuously or substantially continuously according to a safety related standard, further wherein the security domain operates independently of the safety domain;
   wherein the safety domain is configured to, in response to detecting a hardware fault in a component of the safety domain,
      perform a hardware-related remedial action on one or more components of the safety domain; and
      after initiation of the hardware-related remedial action, transmit an alarm signal indicating detection of hardware faults to the security domain; and
   wherein the security domain is configured to, in response to the alarm signal, perform one or more cryptographic service-related security operations.

2. The integrated processing device of claim 1, wherein the security domain is physically separate from the safety domain.

3. The integrated processing device of claim 1, wherein the one or more cryptographic service-related security operations comprise deleting cryptographic keys stored in the security domain.

4. The integrated processing device of claim 1, wherein the one or more cryptographic service-related security operations comprise sending out a security interrupt signal.

5. The integrated processing device of claim 1, wherein the one or more cryptographic service-related security operations comprise resetting one or more settings of the security domain.

6. The integrated processing device of claim 1, wherein the one or more cryptographic service-related security operations comprise locking one or more external interfaces of the security domain.

7. The integrated processing device of claim 1, wherein the one or more cryptographic service-related security operations comprise delaying performance of one or more previously scheduled cryptographic service-related actions for at least a predefined period of time.

8. The integrated processing device of claim 1, further comprising
   a first chip comprising the safety domain; and
   a second chip comprising the security domain, the second chip being separate from the first chip.

9. The integrated processing device of claim 1, wherein the safety domain and the security domain are located on a same semiconductor substrate.

10. The integrated processing device of claim 1, wherein
    the integrated processing device is a semiconductor integrated circuit chip comprising a plurality of processor cores,
    the safety domain comprises one or more first cores of the plurality of processor cores, and
    the security domain comprises one or more second cores of the plurality of processor cores, the first cores being separate from the second cores.

11. The integrated processing device claim 1, further comprising a communication interface, wherein the communication interface is coupled to the safety domain and to the security domain.

12. The integrated processing device of claim 1, wherein the safety domain comprises one or more application specific peripherals.

13. The integrated processing device of claim 1, wherein the security domain comprises at least one cryptographic accelerator or random number generator.

14. The integrated processing device of claim 1, wherein the safety domain is configured to detect one or more hardware faults by obtaining sensor data and detecting operating condition violations in the safety domain from the obtained sensor data.

15. The integrated processing device of claim 14, wherein the sensor data comprises sensor data comprises temperature data, supply voltage data, and/or clock data.

16. The integrated processing device of claim 1, wherein the safety domain is configured to control a motor.

17. The integrated processing device of claim 1, wherein the safety domain is configured to control one or more brakes of a vehicle.

18. The integrated processing device of claim 1, is configured to extract data from one or more radar measurements obtained by the integrated processing device.

19. The integrated processing device of claim 1, wherein the hardware-related remedial action comprises controlling the at least one processing unit of the safety domain to operate in a lockstep mode.

20. A security domain system configured to provide one or more cryptographic services, comprising:
a memory; and
at least one processing unit configured to
receive an alarm signal from a safety domain system that detects hardware faults and operates continuously or substantially continuously according to a safety related standard, the alarm signal indicative of the safety domain system initiating remedial action in response to a hardware fault occurring in the safety domain system, wherein the security domain system operates independently of the safety domain system, and
in response to the alarm signal, perform one or more cryptographic service-related operations in at least one secure state.

21. The security domain system of claim 20, wherein the one or more cryptographic service-related operations comprise deleting cryptographic keys stored in the security domain system.

22. The security domain system of claim 20, wherein the one or more cryptographic service-related operations comprise sending out a security interrupt signal.

23. The security domain system of claim 20, wherein the one or more cryptographic service-related operations comprise resetting one or more settings of the security domain system.

24. The security domain system of claim 20, wherein the one or more cryptographic service-related operations comprise locking one or more external interfaces of the security domain system.

25. An integrated processing device comprising:
a security domain comprising at least one processing unit and a memory and configured to provide one or more cryptographic services;
a safety domain coupled to the security domain, the safety domain comprising at least one processing unit and a memory and configured to execute one or more processes, control one or more peripherals, and provide one more safety measures to detect one or more hardware faults, wherein the safety domain operates continuously or substantially continuously according to a safety related standard, further wherein the security domain is physically separate from the safety domain;
wherein the safety domain is configured to, in response to detecting a hardware fault in a component of the safety domain,
perform a hardware-related remedial action on one or more components of the safety domain; and
after initiation of the hardware-related remedial action, transmit an alarm signal indicating detection of hardware faults to the security domain; and
wherein the security domain is configured to, in response to the alarm signal, perform one or more cryptographic service-related security operations.

* * * * *